No. 867,463.
PATENTED OCT. 1, 1907.
J. G. YINGLING.
METHOD AND APPARATUS FOR PRESERVING LIVE FISH.
APPLICATION FILED DEC. 26, 1906.
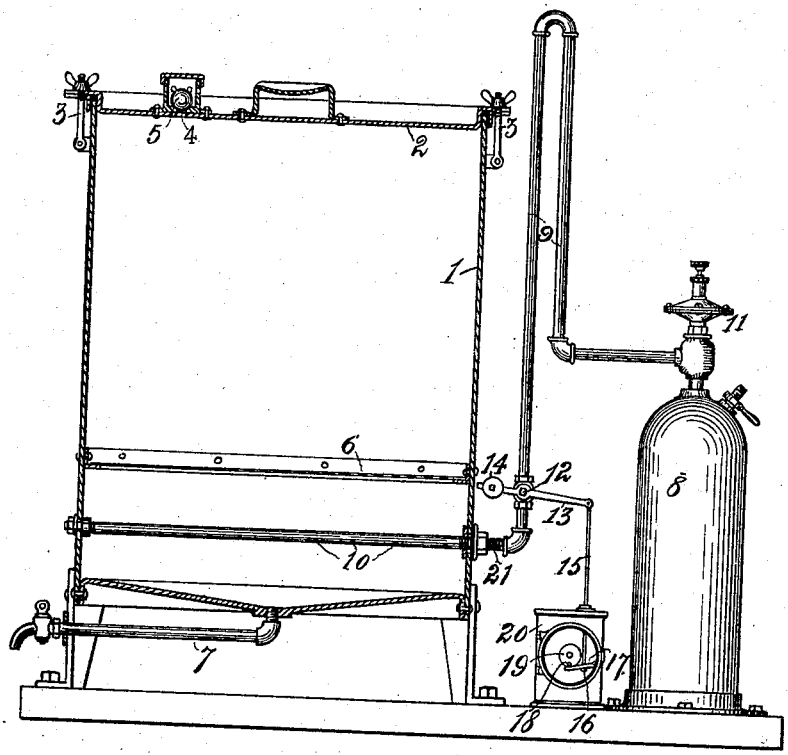
WITNESSES:

UNITED STATES PATENT OFFICE.

JOHN G. YINGLING, OF PORT CLINTON, OHIO.

METHOD AND APPARATUS FOR PRESERVING LIVE FISH.

No. 867,463.　　　　　　Specification of Letters Patent.　　　　　Patented Oct. 1, 1907.

Application filed December 26, 1906. Serial No. 349,392.

*To all whom it may concern:*

Be it known that I, JOHN G. YINGLING, a citizen of the United States, residing at Port Clinton, in the county of Ottawa and State of Ohio, have invented certain new and useful Improvements in Methods and Apparatus for Preserving Live Fish; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

In the transportation of live fish by the means usually employed the chief difficulty has been in the size and weight of the tanks of water requisite for keeping the fish alive and, consequently, the cost of transportation due to the space occupied and the weight of water and tanks. The item of freight has thus been so great that the selling price of live fish in the market has been almost prohibitive.

The object of my invention is to provide a process and an apparatus by means of which the difficulty here indicated may be overcome, and, more particularly, by means of which a great number of fish may be packed in a small volume of water and transported without injury to any distance and without the necessity of frequent change of water and, under ordinary circumstances, without the personal care of an attendant.

In practicing my invention, I employ a water-tight and practically air-tight tank, nearly filled with water in which I place the fish to be transported, leaving barely enough room for the fish to move without injury from contact with their neighbors. Ordinarily the fish after having inhaled and exhaled all the water of the tank would soon die. I have found, however, that by supplying the water with oxygen or mixed oxygen and air, the fish will live without apparent injury for many days.

To this end, therefore, my process consists in supplying to a tank of water containing fish, a regulated quantity of oxygen,—either constantly or at regular suitable intervals,—so that the water becomes and remains impregnated with the gas.

In the single figure of the accompanying drawing I have illustrated in side-elevation an apparatus adapted for carrying out my process, the water-tank being shown in central vertical section.

In the drawing, 1 is a tank, in the present instance of sheet metal,—though it may be of any desired material,—and preferably rectangular in form. The tank is water-tight and has a removable lid 2 which by means of clamps 3 may be secured upon the top of the tank in such manner as to make the tank air-tight. In the lid is an opening 4 closed by a valve 5 which opens outwardly upon sufficient pressure being applied from the interior of the tank.

6 is a horizontal partition or false bottom in the interior of the tank, near its bottom, composed of either perforated metal or, preferably, a wire-screen. The purpose of this wire-screen is to permit the excreta and slime of the fish to fall to the bottom of the tank and to prevent the fish from coming in contact with such deposit. From the bottom of the tank leads a waste-pipe 7 by which the liquid and semi-liquid contents of the tank may be discharged.

8 is a stout metal cylinder into which oxygen-gas is forced and stored under compression. The chamber of the gas-holder 8 is connected with the interior of the tank 1 by means of pipe 9 leading from the gas-holder into the tank beneath the screen 6. The pipe 9, inside the tank, is perforated on its under side, as at 10, to permit the escape of gas in small bubbles so that the gas as it ascends may be equally distributed throughout the body of water in which the pipe is submerged.

In the pipe 9, between the gas-holder and the tank, is a reducing valve 11, of the usual or any preferred construction, by means of which the high pressure in the gas-holder on one side of the valve is reduced to any pre-determined low pressure in the pipe 9 on the other side of the valve. By means of this reducing valve the pressure of the gas delivered into the tank will be uniform notwithstanding the gradual decrease of pressure in the gas-holder.

The reducing valve may be adjusted so that there will be a very small quantity of oxygen supplied to the water-tank constantly, but I find in practice that, no matter how small the uninterrupted feed of gas may be, a large quantity of oxygen is thus soon consumed. I find also that if a small quantity of oxygen be admitted into the water-tank from the gas-holder at intervals, the desired result is obtained while the amount of gas consumed is greatly reduced. In order to obtain this regulated periodic feed of gas to the fish tank, I provide in the pipe 9 a valve 12 which is opened from time to time at any desired interval. By way of illustration I have shown, as one means of accomplishing this result, an arm 13 secured to the stem of the valve 12, weighted at one end, as at 14, and at its other end pivotally connected with the upper end of rod 15 which at its lower end is pivotally connected, as at 16, to an arm 17. This arm or lever is pivotally supported at one end, the other end lying in the path of a stud 18 projecting from wheel 19 which is the final member in a train of gearing in clock 20. This clock is of the usual or any preferred construction and the projecting stud 18 may take the place of the minute-hand of an ordinary clock. The clock may of course be set to run as rapidly or as slowly as may be desired.

The operation of the apparatus will now be apparent. The parts being assembled and connected as described; the gas-holder 8 being supplied with compressed oxygen, either pure or more or less mixed with air; the tank being nearly filled with water and the live fish to be stored being placed in the water close together, and the cover secured in place, now at each rotation of the wheel 19 the stud 18 wipes the end of the arm 17 which, through its connections with the valve 12, causes this valve to open permitting the passage of the gas, which has been reduced in pressure in its flow through the reducing valve 11, through the pipe 9 into the tank near its bottom and out through the perforations 10. As the gas escapes into the fish-tank, it passes upwardly through the water in finely subdivided bubbles, thus impregnating the water with oxygen. The oxygen is taken up by the fish and is given off as waste gases,— presumably carbon-dioxid. When the pressure of gas in the tank above the water is sufficient, the valve 5 is lifted and the waste gases are permitted to escape. The limited movement of the fishes against each other keeps them clean and prevents the accumulation of slime and other substances upon their bodies. These substances fall through the screen 6 and are deposited upon the inclined floor of the tank.

In case several fish-tanks are to be employed, the gas-pipe 9 may be connected to each of the tanks, as at 21, and controlled by the single valve 12 as will be clearly understood without further illustration or explanation.

Having described my invention, what I claim and desire to secure by Letters Patent is, 1. The process of preserving live fish which consists in confining the fish in water in a tank of limited depth and area and then, during the storage period, at regular predetermined intervals, supplying to and mixing with the water a regulated volume of oxygen.

2. The process of preserving live fish which consists in confining the fish in water in a tank of limited depth and area, then during the storage period, supplying to and mixing with the water a suitable volume of oxygen and then confining the gas in the water tank at a pressure greater than atmospheric pressure.

3. In an apparatus of the described character, a tank, a gas-holder, connections between the tank and the gas-holder, a reducing valve for delivering gas from said holder through said connections at a uniform pressure, and an escape-valve connected with the top of the tank arranged to control the pressure of the gas in the tank.

4. An apparatus of the described character, comprising a tank, a foraminous false bottom in the tank, a gas-holder, a pipe leading from the chamber of the gas-holder into the lower part of the chamber of the tank, means for delivering gas through said pipe into the tank at a uniform regulated pressure, a valve in said pipe, and means for automatically opening and closing said valve at predetermined intervals.

5. In an apparatus of the described character, a tank, a gas-holder, connections between the tank and gas-holder, means for delivering gas through said connections at uniform pressure, a valve in said connections, and means for automatically opening and closing said valve at predetermined intervals.

In testimony whereof I affix my signature in presence of two witnesses.

JOHN G. YINGLING.

Witnesses:
DAVID C. WALTER,
ADA LAW.